United States Patent [19]

Amerine

[11] Patent Number: 4,580,730
[45] Date of Patent: Apr. 8, 1986

[54] ROTARY SPREADER

[75] Inventor: James D. Amerine, Marysville, Ohio

[73] Assignee: O. M. Scott & Sons Company, Marysville, Ohio

[21] Appl. No.: 604,987

[22] Filed: Apr. 27, 1984

[51] Int. Cl.$^4$ ............................................. A01C 17/00
[52] U.S. Cl. .................................... 239/687; 239/683; 239/684
[58] Field of Search ................. 239/687, 684, 685, 681

[56] References Cited

U.S. PATENT DOCUMENTS

| | | |
|---|---|---|
| 321,879 | 7/1885 | Amundson et al. ................. 239/685 |
| 839,394 | 12/1906 | Klein ................................... 239/685 |
| 1,998,966 | 4/1935 | Plas . | 
| 2,192,802 | 12/1938 | Pound ................................. 239/681 |
| 2,287,080 | 6/1942 | Arndt . |
| 2,550,303 | 10/1946 | Simpson ............................. 239/687 |
| 3,094,333 | 6/1963 | Rausch . |
| 3,193,297 | 7/1965 | van der Lely et al. ............. 239/687 |
| 3,411,719 | 11/1968 | Babiciu et al. ..................... 239/667 |
| 3,478,970 | 11/1969 | Siwersson et al. .................. 239/687 |
| 4,032,074 | 6/1977 | Amerine ............................. 239/685 |
| 4,316,581 | 2/1982 | van der Lely et al. ............. 239/687 |
| 4,491,275 | 1/1985 | Holsworth ......................... 239/687 |

FOREIGN PATENT DOCUMENTS 119039  8/1943  Sweden ............................... 239/687

Primary Examiner—Jeffrey V. Nase
Assistant Examiner—Scott D. Malpede
Attorney, Agent, or Firm—James B. Raden; Harold J. Holt

[57] ABSTRACT

A rotary spreader for particulate material having a hopper for the particulate material and an impeller adapted to broadcast the material as it is discharged from the hopper. The impeller has a ridge enclosing the central portion of the impeller and the impeller is mounted in close proximity to the hopper so that discharged material is contained within the enclosed central portion of the impeller to stop further flow of particulate material when the impeller is not rotating.

6 Claims, 7 Drawing Figures

ROTARY SPREADER

This invention relates to a rotary spreader for particulate material, particularly of the type used for the distribution by the homeowner of fertilizer, pesticides or seeds to the soil or turf.

Material spreaders of both the drop and rotary type used on home lawns normally require an on/off lever to open and close the port openings. The user operates the lever to avoid uneven spreader patterns at turns and stops. If the spreader is stopped without closing the ports, the material will continue to discharge through the ports, causing excessive distribution of particulate material and frequently damage to the turf or other vegetation.

Rotary spreaders typically possess an additional drawback. Particulate material is dropped onto a limited arc of the impeller; the impeller then throws or broadcasts the material in a fan-shaped pattern in front of the spreader and to the sides. The purpose of this is to avoid throwing particulate material against the operator of the spreader. The total throw width is typically 50 to 100%, or even more, wider than the effective swath path. Adjacent patterns are then heavily overlapped to insure complete coverage of the turf or soil. In addition, all of the fins on the impeller of a typical rotary spreader are of identical length and shape. All of the particulate material is therefore thrown from the impeller a fairly constant radial distance, tending to produce a skewed or uneven overall pattern of distribution.

Commercial and agricultural rotary spreaders normally have a means of adjusting the pattern to eliminate skewing due to varying material properties, but home lawn spreaders usually do not incorporate such an adjustment feature. As a result, home lawn spreaders tent to provide a skewed pattern with any material other than the optimum material for which the spreader is designed. In addition, unless the arc of throw is restricted to a narrow forward arc, peaks will normally occur where the patterns overlap at the sides.

The wide throw width, relative to the effective swath width, exaggerates edge effect-light coverage at the edge of lawn areas or coverage substantially beyond the lawn area. The wide throw width also increases the probability of drift problems and increases the risk of throwing the particulate material onto non-target vegetation.

U.S. Pat. No. 1,998,966 to Plas discloses a road scattering machine in which the hopper is mounted close to a pair of valve plates to avoid outward flow of the material in the hopper. U.S. Pat. No. 2,287,080 to Arndt shows a spreader having fins of varying length, although all are at the same radial distance from the center. U.S. Pat. No. 3,411,719 to Babiciu shows stacked impellers, the different impellers having different fin lengths. U.S. Pat. No. 3,478,970 to Siwerson shows different fin lengths on an impeller where material flow is upward. U.S. Pat. Nos. 839,394 to Klein and 3,094,333 to Rausch show spreaders with 360° distribution patterns. However, none of the aforementioned patents suggest a solution to the problems set forth above with respect to spreaders of the type here described.

The present invention is directed to a rotary spreader which avoids the problem of continuous material discharge by the provision on the impeller of a raised ridge of ring enclosing the central portion of the impeller. The impeller is mounted very close to the bottom of the hopper so that particulate material does not continue to flow when the discharge ports are open and the impeller is not rotating. A small quantity of particulate piles up inside the ring at which point further flow stops; once the impeller begins to rotate, material is thrown over the ring and the spreader operates as if the ring were not present. In addition, the invention also provides, in its preferred form, for distribution of particulate in a uniform 360° arc around the spreader; thus skewing is avoided and pattern adjustment features are unnecessary. Finally, multiple fin lengths are provided on the impeller to throw the particulate material different radial distances, thus providing better particulate distribution and greater pattern uniformity.

More specifically, the invention is directed to a rotary spreader for particulate material adapted for advance along a given path comprising a hopper for holding the particulate material and an impeller mounter in association with the hopper and adapted to rotate as the spreader is advanced, the hopper having a discharge port comprising a series of openings to discharge material onto the impeller for broadcasting the particulate material. The openings of the discharge port are positioned to discharge material onto a central portion of the impeller. The impeller has a raised ridge facing the discharge port and enclosing the central portion of the impeller. The impeller is mounted beneath the hopper in sufficiently close proximity to the hopper so that when the impeller is not rotating, the ridge contains the discharged particulate material within the enclosed central portion of the impeller to stop further flow of particulate material after build-up of particulate occurs within the enclosed central portion. In its preferred form, the openings within the hopper are spaced approximately equidistant around said discharge port so as to discharge material onto said impeller in a 360° arc and the impeller contains at least two sets of radial fins, the first set of which terminates a different distance from the center of said impeller than the second set, the spreader thus broadcasting the particulate material in a uniform 360° arc around the spreader as it is advanced along its path.

The invention will be better understood by reference to the accompanying drawing in which.

Figure 4:
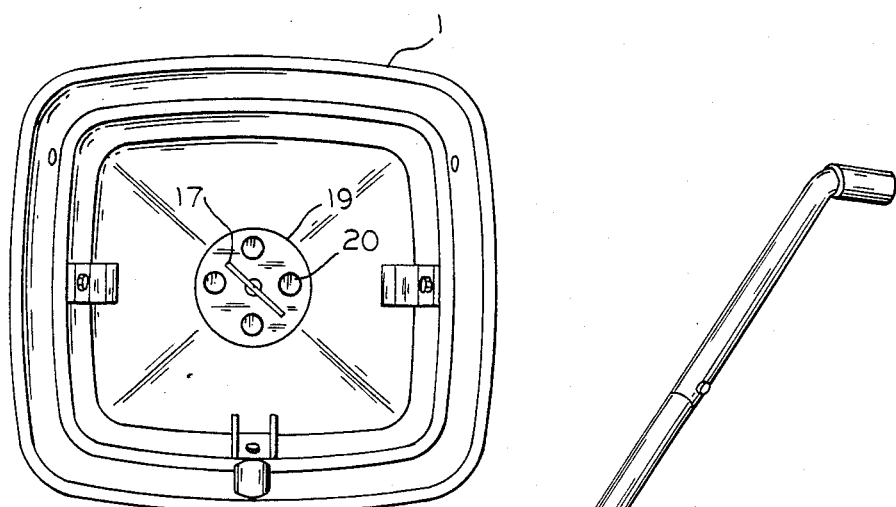
FIG. 4 is a plan view of the hopper of FIGS. 1-3.
Figure 1:
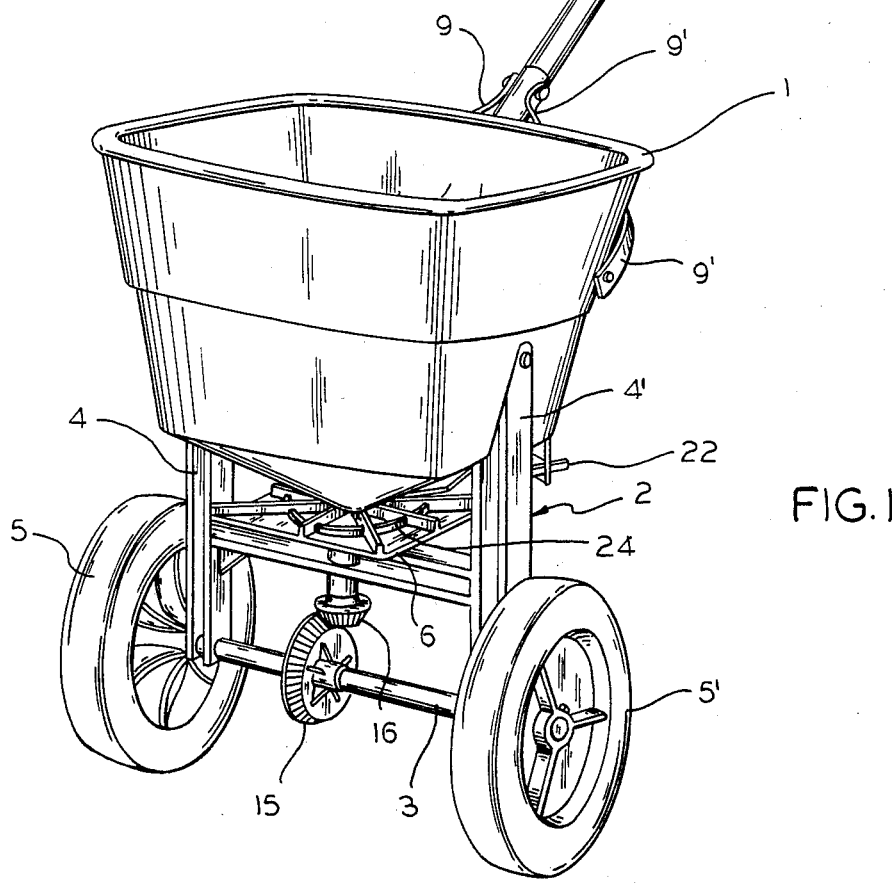
FIG. 1 is a perspective view of a spreader in accordance with one embodiment of the invention.

Referring to the drawing, the rotary spreader of the invention comprises a hopper 1 for particulate material supported by an H-shaped frame shown generally at 2 mounted on an axle 3 journaled within the lower ends of the vertical legs 4 and 4' of the frame 2 and a pair of ground engaging wheels 5 and 5'. The opposite ends of the legs 4 and 4' are bolted to the hopper 1. An impeller 6 is horizontally and fixedly mounted on a hollow vertical shaft 7 (FIG. 5) rotatably driven at the lower end thereof by a powered drive connection. A handle 8 for pushing the spreader is fastened to the hopper by means of a pair of braces 9 and 9' and a leg 10, the braces and leg being bolted to the hopper. At least one of the wheels 5 and 5' is fixedly connected to axle 3 for transmitting power to shaft 7 by means of a bevel drive gear 15 fixedly mounted on axle 3 in meshing relationship with a smaller pinion gear 16 fixedly mounted on vertical shaft 7. Within the hopper is an agitator 17 fixedly mounted on a shaft 18 within the hollow interior of impeller shaft 7. It will be seen that the wheels are in power drive connection with the shaft 7 for rotation of the impeller 6 and, if desired, the agitator 17.

Figure 3:
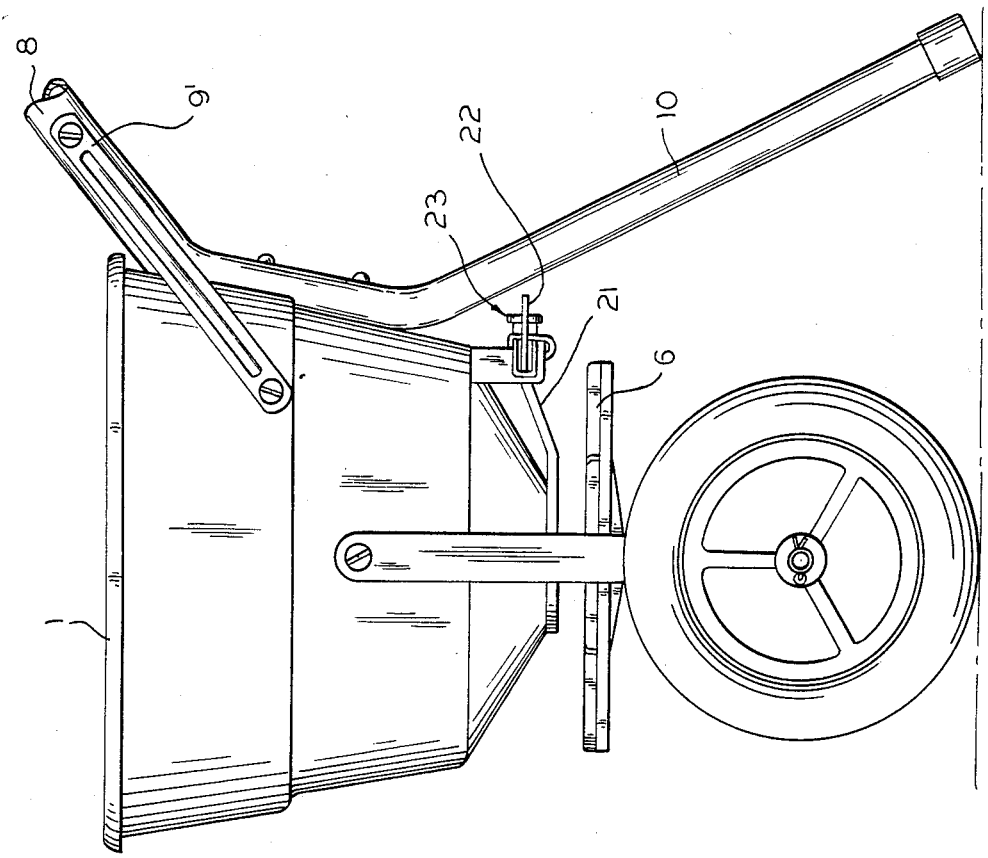
FIG. 3 is a side elevational view of the spreader of FIG. 1.
Figure 2:
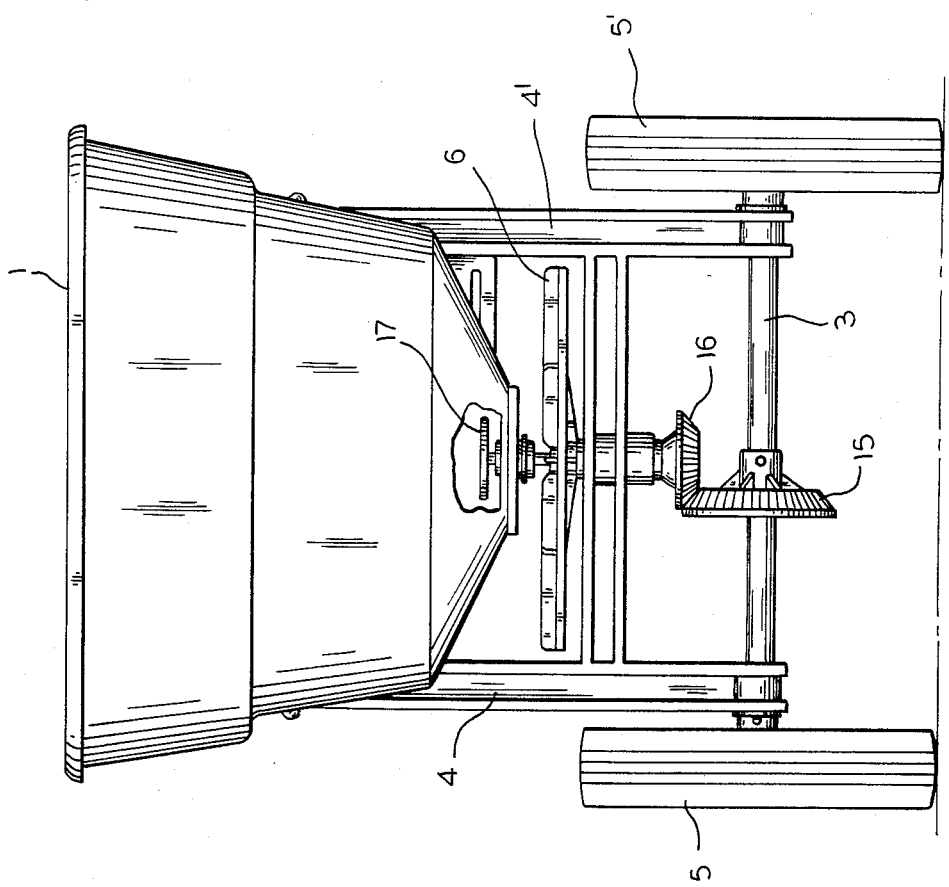
FIG. 2 is a front elevational view of the spreader of FIG. 1, partially broken away to show the central lower interior portion of the hopper.

The discharge port 19 of the hopper is shown in FIG. 4 and comprises four identical openings 20 spaced equidistant around the discharge port so as to discharge particulate onto the impeller in a 360° arc. The size of the four openings 20 may be adjusted by a shut-off lever 21 shown most clearly in FIG. 3. The shut off lever contains four openings of the same size as discharge openings 20. The openings in the shut-off lever may be moved into, out of, or in partial registry with the discharge openings by sliding the shut-off lever handle 22 horizontally in either direction. A knob and slide pointer assembly 23 may be adjusted by loosening the knob, sliding the pointer to the correct spreader setting and tightening the knob. The handle 22 may then be moved against the adjusted pointer setting for the appropriate open position of the spreader or to the opposite extremity for the closed position to shut off flow of particulate.

Figure 6:
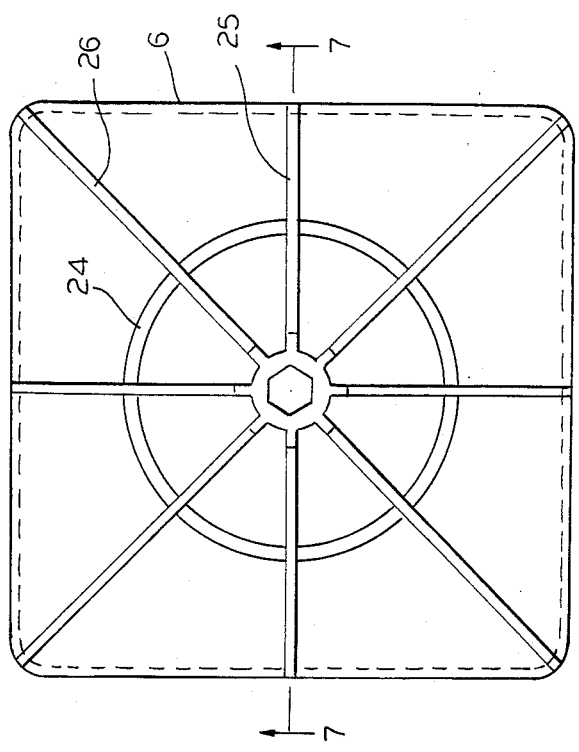
FIG. 6 is a plan view of the impeller shown in FIGS. 1-5.
Figure 7:
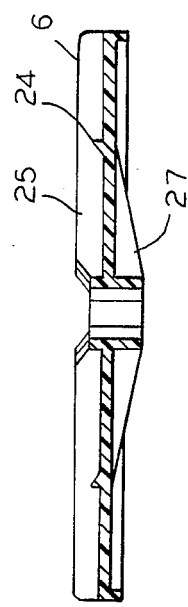
FIG. 7 is a crossectional view of the impeller taken along the lines 7—7 of FIG. 6.
Figure 5:
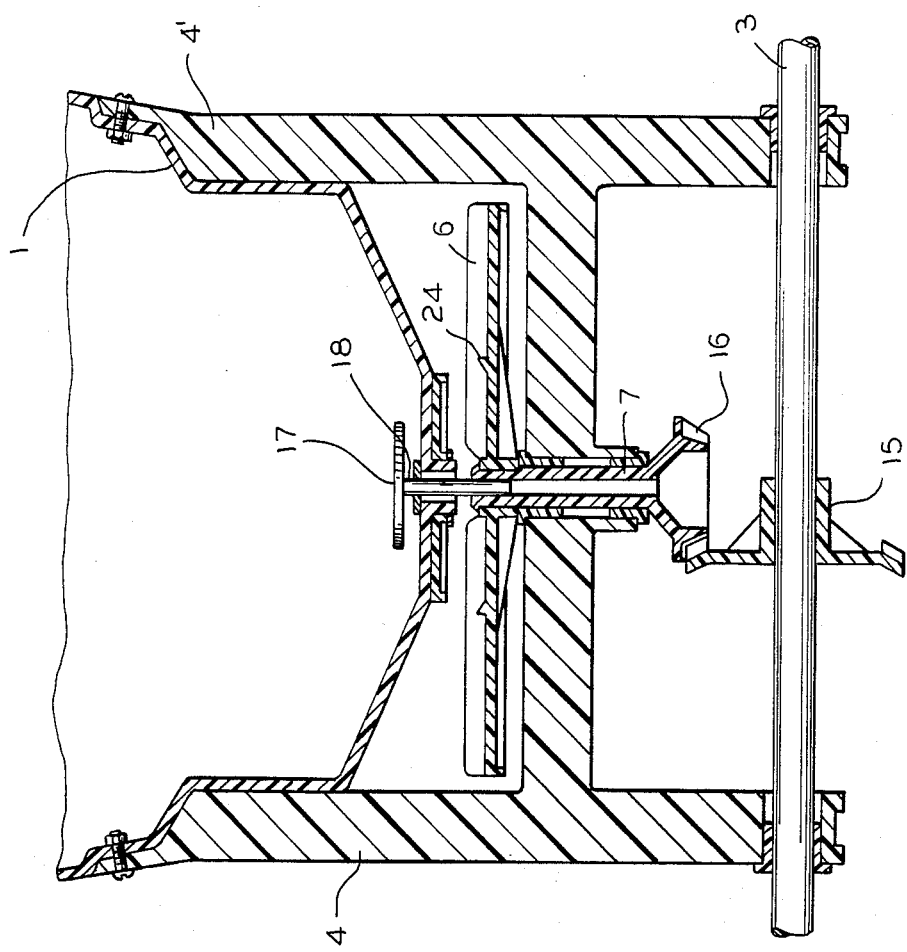
FIG. 5 is an enlarged crossectional view of a portion of the spreader of FIG. 1.

The impeller 6, as shown most clearly in FIGS. 5–7, is mounted beneath but in close proximity to the hopper. The impeller may assume a variety of configurations but is conveniently rectangular and is illustrated in the drawing in its preferred square configuration. It contains a raised ridge portion or ring 24 in the form of an annulus facing the discharge port of the hopper and having a diameter slightly larger than the diameter of the discharge port 19. The annular ridge 24 encloses the central portion of the impeller and serves to contain the particulate material discharged when the discharge port is open and the impeller is not rotating. The impeller contains eight fins—a set of four short radial fins 25 and four long radial fins 26, the two sets terminating at different radial distances from the center of the impeller. As is apparent from FIG. 7, the annular ridge 24 is considerably shallower in height than the fins. Fins 25 and 26 may, for example, be about ¼ inch high verses about 1/16 inch for ridge 24. The impeller also contains eight radially extending reinforcing ribs 27 on its underside.

In operation, particulate material is discharged uniformly around the impeller. In the embodiment shown, discharge occurs at four points spaced 90° apart. Thus material is thrown off in a uniform 360° circular pattern and skewing, resulting from the use of a discrete arc, is eliminated. The impeller is of smaller than normal diameter and the ratio between drive gear 15 and pinion gear 16 is relatively low so that the impeller is rotated more slowly than that of a typical home lawn spreader. The tip velocity of the impeller is typically about 490 feet per minute at 2.75 miles per hour for the spreader of the invention as contrasted with about 925 feet per minute tip velocity for a typical rotary spreader in usage today. The slower rotation and smaller diameter impeller of the present spreader restricts the overall throw to a diameter of about three and a half feet. Since the effective swath width is two and a half feet, the spreader provides adequate tapering overlap without the excessive swath width characteristic of home rotary spreaders in use today—typically throwing particulate product eight feet for an effective swath width of only three feet. In addition, the shorter throw width prevents material from being thrown against the operator. Moreover, the circular pattern is very uniform because of the variation in radial throw from the compound impeller. A very uniform effective swath width is obtained for a wide range of particulate materials without skewing and without pattern adjustment. The two fin lengths also eliminate any peaking from the four discrete port openings. When the discharge port is open but the impeller is not rotating, a small quantity of particulate material will pile up inside the ring, then flow will stop. When rotation of the impeller resumes, material will be thrown over the ring and the spreader will operate ar if the ring were not present. This arangement eliminates the need for an on/off lever in normal use, and eliminates material leakage when the spreader is stopped without closing the ports.

What is claimed is:

1. In a rotary spreader for particulate material adapted for advance along a given path comprising a hopper for holding the particulate material and an impeller mounted in association with said hopper and adapted to rotate as the spreader is advanced, said hopper having a discharge port comprising a series of openings therein to discharge material onto said impeller for broadcasting the particulate material, the improvement in which the openings of said discharge port are positioned to discharge material onto a central portion of said impeller, said impeller having radial ribs thereon, said impeller also having a raised ridge thereon at a central portion of the impeller facing said discharge port and completely enclosing together with said radial ribs the entire central portion of said impeller, the impeller being mounted beneath the hopper in sufficiently close proximity thereto so that when the impeller is not rotating, the ridge and hopper contain the discharged particulate material within the enclose central portion of the impeller to stop further flow of particulate material after build-up of particulate occurs within said enclosed central portion.

2. The spreader of claim 1 in which the openings within said hopper are spaced approximately equidistant around said discharge port so as to discharge material onto said impeller in a 360° arc.

3. The spreader of claim 1 in which the impeller contains at least two sets of radial fins, the first set of which terminates a different radial distance from the center of said impeller than the second set, said spreader broadcasting said particulate material from said impeller in a uniform 360° arc around said spreader as the spreader is advanced along said path.

4. The spreader of claim 1 in which the ridge on the impeller is in the form of an annulus.

5. The spreader of claim 3 in which the fins of shorter radial distance from the center alternate around the impeller with the fins of longer radial distance from the center.

6. The spreader of claim 5 in which the impeller is rectangular and more set of fins extends from the central portion to the corners thereof and the second set of fins extends from the central portion to the sides thereof.

* * * * *